United States Patent [19]

Chiu

[11] Patent Number: 4,689,743
[45] Date of Patent: Aug. 25, 1987

[54] METHOD AND AN APPARATUS FOR VALIDATING THE ELECTRONIC ENCODING OF AN IDEOGRAPHIC CHARACTER

[76] Inventor: Andrew Chiu, 9 Chapel Park Square, Scarborough, Ontario, Canada, M1V 2S3

[21] Appl. No.: 828,347

[22] Filed: Feb. 11, 1986

[51] Int. Cl.⁴ ............................................ G06F 15/38
[52] U.S. Cl. ................................... 364/419; 364/900; 400/110; 400/484
[58] Field of Search ............... 364/419, 200 MS File, 364/900 MS File; 371/48, 72; 365/49–50; 382/1; 400/63, 109–110, 484; 178/30; 434/156–157

[56] References Cited

U.S. PATENT DOCUMENTS

| | | | |
|---|---|---|---|
| 4,173,753 | 11/1979 | Chou | 340/146.3 R |
| 4,187,031 | 2/1980 | Yeh | 400/484 X |
| 4,244,657 | 1/1981 | Wasylyk | 400/109 |
| 4,270,022 | 5/1981 | Loh | 178/30 |
| 4,327,421 | 4/1982 | Wang | 364/900 |
| 4,379,288 | 4/1983 | Leung et al. | 340/365 R |
| 4,462,703 | 7/1984 | Lee | 400/110 |
| 4,505,602 | 3/1985 | Wong | 400/110 |
| 4,599,612 | 7/1986 | Kaji et al. | 434/157 X |

FOREIGN PATENT DOCUMENTS 2066534A 7/1981 United Kingdom .

OTHER PUBLICATIONS

J. Mathias et al., "Ideograph Writing Patterns and Computer Input", *Proceedings of International Computer Conference: Hong Kong 1980*, Oct. 1980, pp. 2–4.1 to 2–4.9.

Primary Examiner—Gary V. Harkcom

[57] ABSTRACT

A method and apparatus for validating the electronic and coding of an incoming ideographic character, having a particular complexity and encoded according to a group of predetermined basic stroke elements and stroke sequencing rules to define an incoming character code, for use in association with a set of standard ideographic characters, encoded according to the group of pre-determined stroke elements and stroke sequencing rules to define standard character codes, each standard character having a certain complexity, the set being ordered according to the complexities of the standard characters. The method comprises the steps of specifying a portion of the standard set according to the complexity of the incoming ideographic character, searching such portion for at least a closest match between the incoming character and the standard character, and determining a sub-set of the portion, the sub-set containing at least one standard character code having the closest match with the incoming character code, and, selecting one member of the sub-set of closely match standard character codes as the correct code for the incoming character. The apparatus comprises a character complexity analyzer to determine the complexity of the incoming character. A comparison boundary setter specifies a portion of the standard set to be searched according to the complexity of the incoming character. A character comparator searches such portion for at least a closest match. A selector selects one of the most closely match standard character codes as the correct code for the incoming character.

43 Claims, 11 Drawing Figures

| CHARACTER | CHARACTER CODE | LENGTH NUMBER | COMPLEXITY NUMBER |
|---|---|---|---|
| 、 | 1 | 1 | 1 |
| 十 | 23 | 2 | 6 |
| 丈 | 245 | 3 | 7 |
| 士 | 232 | 3 | 9 |
| 传 | 43223241 | 8 | 20 |
| 井 | 23454223 | 8 | 21 |
| 芊 | 23321423 | 8 | 21 |
| 募 | 23332322452311 | 15 | 40 |
| 雪 | 231432322323231 | 15 | 40 |
| 喂 | 323232323223145 | 15 | 41 |

FIG.2.

| LENGTH NUMBER | COMPLEXITY NUMBER | START ADDRESS | FINISH ADDRESS |
|---|---|---|---|
| 10 | 22 | 250 | 399 |
| 10 | 23 | 400 | 499 |
| 10 | 24 | 550 | 599 |
| 10 | 25 | 600 | 649 |
| 10 | 26 | 650 | 699 |
| 10 | 27 | 700 | 925 |
| 11 | 19 | 926 | |

FIG.4.

IDEOGRAPHIC CHARACTER

| BASIC STROKE ELEMENTS | TYPE | ELEMENT CODE | RELIABILITY WEIGHTING FACTOR |
|---|---|---|---|
| | DOT | 1 | 1 |
| | HORIZONTAL — | 2 | 3 |
| | VERTICAL | 3 | 3 |
| | LEFT OBLIQUE / | 4 | 2 |
| | RIGHT OBLIQUE \ | 5 | 2 |

CHARACTER CODE STRING: 42321

CHARACTER LENGTH NUMBER: 5

(5 component strokes, 5 code components).

| BASIC STROKE ELEMENT | STROKE COUNT | | WEIGHTING FACTOR | | WEIGHTED STROKE COUNT |
|---|---|---|---|---|---|
| DOT | 1 | x | 1 | = | 1 |
| HORIZONTAL | 2 | x | 3 | = | 6 |
| VERTICAL | 1 | x | 3 | = | 3 |
| LEFT OBLIQUE | 1 | x | 2 | = | 2 |
| RIGHT OBLIQUE | 0 | x | 2 | = | 0 |

TOTAL = CHARACTER COMPLEXITY N° = 12

OPTIONAL IDENTIFICATION CODE: 12110

| BASIC TERMS | |
|---|---|
| IN THE CHARACTER | CORRESPONDING TERM IN CODE |
| CHARACTER<br>e.g. 九 | CHARACTER CODE OR CHARACTER CODE STRING e.g. 42321 |
| STROKE ELEMENT<br>e.g. DOT<br>HORIZONTAL —<br>VERTICAL ∣<br>LEFT OBLIQUE ╱<br>RIGHT OBLIQUE ╲ | ELEMENT CODE<br>e.g. 1<br>2<br>3<br>4<br>5 |
| COMPONENT STROKE<br>e.g. 九<br>九<br>九<br>九<br>九 | CODE COMPONENT<br>e.g. (4)2321<br>4(2)321<br>42(3)21<br>423(2)1<br>4232(1) |

METHOD AND AN APPARATUS FOR VALIDATING THE ELECTRONIC ENCODING OF AN IDEOGRAPHIC CHARACTER

NATURE OF THE INVENTION

The invention relates to a method and an apparatus for validating the encoding of a character, and in particular for validating the encoding of a character encoded according to a set of pre-determined basic strokes.

BACKGROUND OF THE INVENTION

Some written languages, such as Chinese, Japanese and Korean, use individual symbols (that is, ideographs, or ideographic characters) to represent individual words or concepts. Such languages do not traditionally possess an alphabet from which words and phrases are constructed. Although a language may have 30,000 or more ideographs, generally fewer are required for everyday use. However, even for everyday use, the number of ideographs with which a person must be familiar is relatively high. For example, in Chinese, a written vocabulary of 10,000 ideographs would generally be sufficient for most uses. Some official vocabularies define about 7,500 words, which would provide reasonable proficiency in written communication.

Such large numbers of different ideographs result in difficulties in written communication. A writer must have a high degree of literacy. He must have most standard ideographs memorized, or be constantly checking an ideographic dictionary. A publisher must have a substantial library of different ideographic characters. Physically, it may be difficult to store a large number of ideographic printing elements. Once in storage, it may also be difficult to relocate a particular printing element for use. Typewriters may have hundreds of keys, resulting in slow, inconvenient typing.

Similarly, in telecommunications or in electronic data processing systems, conventionally each ideographic character is assigned a unique, but arbitrary, code. In order to input text into such a system, an operator must memorize thousands of codes, or be constantly checking codes from a table. The former case requires a highly trained operator. The latter case requires large expenditures of time. In addition, tables, lists or dictionaries of ideographic characters are conventionally arranged according to phonetic rules. Accordingly, even in the latter case the operator must have some phonetic training in the language in order to be able to locate the proper codes from a phonetically arranged table.

In order to improve the use of ideographic characters, particularly in electronic applications, various methods have been proposed for the systematic encoding of ideographic characters. See, for example, U.S. Pat No. 3,665,450; 4,173,753; 4,327,421; 4,379,288; 4,462,703; 4,490,789; and 4,505,602. The specific application of such methods may vary depending on the specific language. However, in general, the principles for such methods are similar.

Generally, the ideographic characters of the language are analyzed into their component strokes. Such strokes are compared to a pre-determined set of idealized basic stroke elements. Each basic stroke element may correspond to one or more actual component strokes. Each stroke in the character is identified with one of the idealized basic stroke elements. For example, U.S. Pat. No. 4,173,753 teaches that most Chinese characters may be reasonably encoded by considering only six basic stroke elements—a horizontal stroke, a vertical stroke, a dot, a dash (oblique) stroke, a clockwise angular stroke and a counter-clockwise angular stroke. As shown in various examples therein, different ideographic characters may be encoded, and even approximated, by considering the same six basic stroke elements. U.S. Pat. No. 4,173,753 teaches a relatively simple scheme for encoding. Others, such as U.S. Pat. No. 3,665,450, may teach a more complex method.

In conventional coding methods (as exemplified by U.S. Pat. No. 4,173,753), the encoding of an ideographic character is accomplished by assigning a unique element code (for example, a number or letter) to each basic stroke element. The character code is a string of code components, each of which is an element code. The code components of a character code correspond to the component strokes of the ideographic character.

The code components for an ideographic character are ordered according to a pre-determined sequence or pre-determined rules to form the character code. The character code may then be used as desired, for example, as input to a telecommunications system or an electronic data processing system. Typically, the pre-determined sequence or rules correspond to those of traditional character writing. For example, in some languages, the component strokes of an ideographic character may be written from the upper left hand corner to the lower right hand corner. Accordingly, an encoding scheme for such language may typically follow the same convention. That is, the first code components in the character code would correspond to the component strokes of the upper left hand corner of the ideographic character. The last code components of the character code would correspond to the component strokes of the lower right hand corner of the ideographic character.

Conventional coding techniques pose numerous difficulties. First, a highly skilled and literate operator is required, because of the necessity of knowing traditional stroke writing order or rules. Second, different people from different places or with different educational backgrounds may be familiar with different stroke orders or rules. Accordingly, it may be difficult to define a standard stroke order or standard rules. Third, many strokes of an ideographic character are not necessarily or easily identifiable with one of the defined basic stroke elements. For example, one person may identify a stroke as a dot element, whereas a different person may identify it as a horizontal element.

Because of such difficulties, conventional encoding may result in coded characters and text which are significantly inaccurate. In the worst case, decoded output may be virtually incomprehensible. Even in the best case, there may be significant errors which may cause unreliability, inconvenience, embarassment or poor decision making.

STATEMENT OF THE INVENTION

The invention comprises a method for validating the encoding of an incoming character having a particular complexity and encoded according to a group of pre-determined basic stroke elements and stroke sequencing rules to define an incoming character code, for use in association with a set of standard characters encoded according to the group of pre-determined basic stroke elements and stroke sequencing rules to define standard character codes, each standard character having a certain complexity, the set being ordered according to the complexities of the standard characters, the method comprising the steps of specifying a portion of said set according to the complexity of said incoming character, searching said portion for at least a closest match between said incoming character code and a said standard character code, and determining a sub-set of said portion, said sub-set containing at least one standard character code having said closest match with said incoming character code, and, selecting member one of said sub-set of closely matched standard character codes as the correct code for said incoming character.

The invention also comprises an apparatus for validating the encoding of an incoming character having a particular complexity and encoded according to a group of pre-determined basic stroke elements, and stroke sequencing rules to define an incoming character code for use in association with a set of standard characters, encoded according to said group of pre-determined basic stroke elements and stroke sequencing rules to define standard character codes, each standard character having a certain complexity, said set being ordered according to the complexities of the standard characters, the apparatus comprising character complexity analysis means for receiving the incoming character code and determining the complexity of the incoming character according to the incoming character code, comparison boundary setting means connected to said complexity analysis means, character comparator means connected to said boundary setting means, storage means connected to said comparator means for storing said set, said boundary setting means being operable to specify a portion of said set according to the complexity of said incoming character, said comparator means being operable to search said portion for at least a closest match between said incoming character code and a said standard character code, and determining a sub-set of said portion, said sub-set containing at least one standard characer code having said closest match with said incoming character code, and, selector means connected to said comparator means for selecting one member of said sub-set of closely matched standard character code as the correct code for said incoming character.

The method and apparatus of the invention allow coded ideographic characters to be validated relatively quickly and conveniently. Thus, error may be reduced. Validation of newly encoded characters may be accomplished at a reasonable speed which would not hinder unduly, if at all, an operator's speed or efficiency.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 2 is a table, listing sample characters from a defined set of ideographic characters, organized according to character complexity;

FIG. 4 is a schematic drawing, illustrating the layout of a sample index as may be used in an embodiment of the comparison boundary setting means of FIG. 1;

FIG. 5 is an example, showing the operation of the complexity analysis means of FIG. 2 in relation to a particular ideographic character;

FIG. 11 is a table comparing various terms.

DETAILED DESCRIPTION OF A SPECIFIC EMBODIMENT

Figure 1:
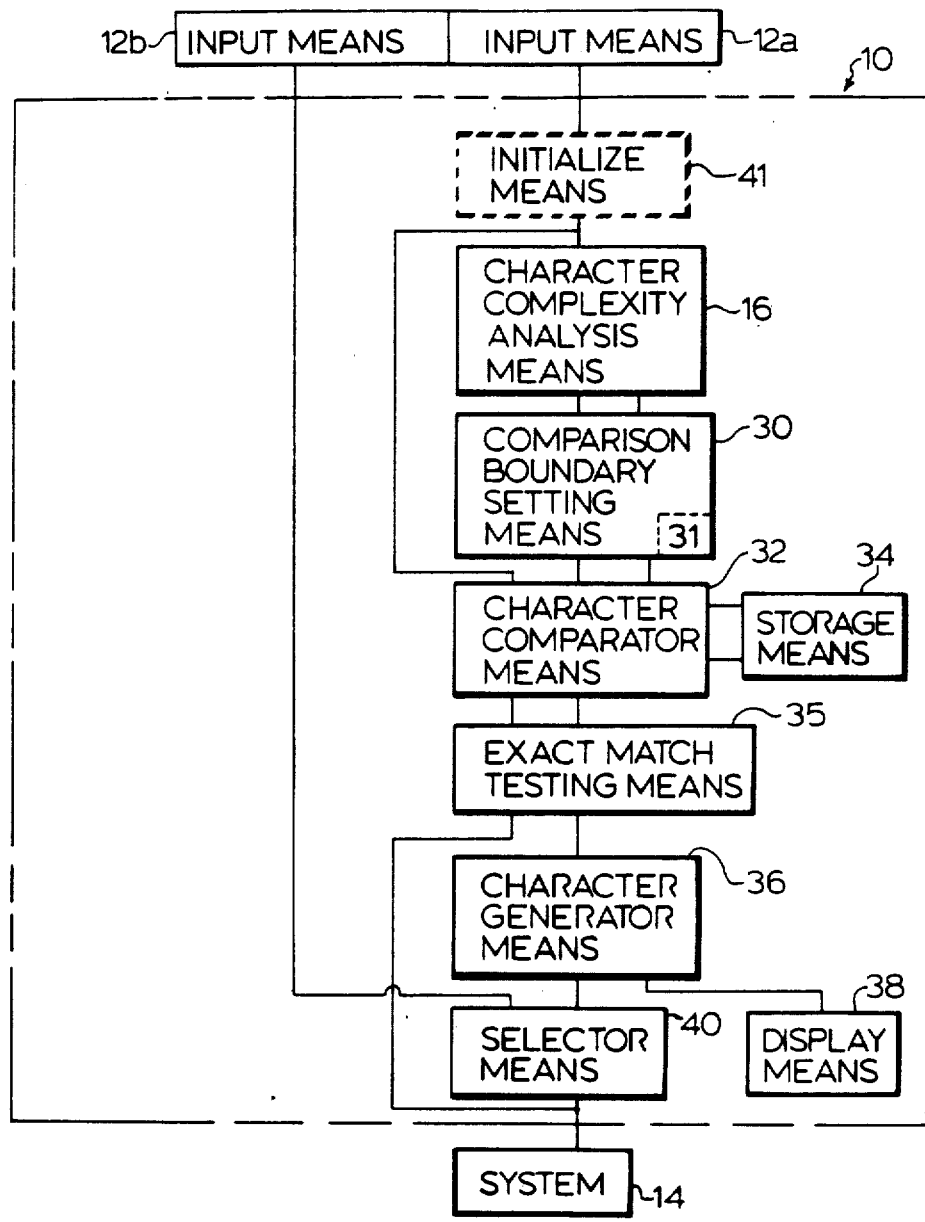
FIG. 1 is a block diagram of an apparatus according to the invention.

Referring to FIG. 1, a validation device 10 according to the invention is shown connected to input means 12a, which may be for example a keyboard or digitizer. Validation device 10 is adapted to receive a character code from input means 12a. The character code represents an encoding of an ideographic character according to a set of pre-determined basic stroke elements and pre-determined sequence or sequencing rules. The character code is a string of code components, each component being an element code. The code components of the character code correspond to the component strokes of the ideographic character. For convenience, the various terms as used in this specification are set forth in FIG. 11. Validation device 10 tests the validity of the character code in a manner described below. As will be seen, if the character code is incorrect, validation device 10 may activate an optional alarm means to alert the operator. Validation device 10 may then present a group of possible correctly encoded characters to the operator, who may then select the correct character or make another attempt to correctly encode the ideographic character which he desires to enter.

The output of validation device 10 is connected to system 14, which may be a telecommunications system, an electronic data processing system, an electronic typewriter output or the like.

Validation device 10 according to the invention comprises a character complexity analysis means 16, adapted to receive the character code from input device 12a. Complexity analysis means 16 is operable to assess the complexity of the incoming character. Complexity may be conveniently considered as a physical property of the character based on its structure. Referring to FIG. 2, the characters in the left hand column are arranged by increasing complexity. It is to be noted that said characters generally have increasingly complicated geometry and visual appearance.

Complexity analysis means 16, more specifically, is operable to count the total number of code components in the character code string, yielding a length number. Such character length number corresponds to the length of the character code and, thus, to the number of component strokes in the ideographic character. The character length number may also be considered as a first approximation to the complexity of the character. Complexity analysis means 16 is operable to deliver the character length number to one output.

Complexity analysis means 16 preferably is also operable to count the number of code components of each different element code in the character code string. Such counts may be considered as stroke counts, representing the number of each different type of basic stroke element associated with the ideographic character.

Complexity analysis means 16 preferably is also operable to assign a pre-determined reliability weighting factor to each element code. The weighting factors are pre-determined according to the likelihood of a correct identification between a component stroke of an ideographic character and one of the basic stroke elements. Weighting factors are used in order to take into account possible confusion between types of strokes and basic stroke elements. For example, a horizontal stroke would virtually never be confused with a vertical basic stroke element. However, it might sometimes be confused with a dot basic stroke element, depending on the ideographic character, handwriting style, basic stroke elements and the like.

Complexity analysis means 16 preferably is also operable to multiply each stroke count by its corresponding reliability weighting factor, to yield a weighted stroke count.

Finally, complexity analysis means 16 preferably is also operable to add the weighted stroke counts together to yield a character complexity number. The complexity number may be considered as representing an assessment of the complexity of the character, taking into account the likelihood that its components may be confusing and improperly encoded. FIG. 2 illustrates sample ideographic characters arranged according to character length number and character complexity number. Complexity analysis means 16 is operable to deliver the complexity number to another output.

Figure 3:
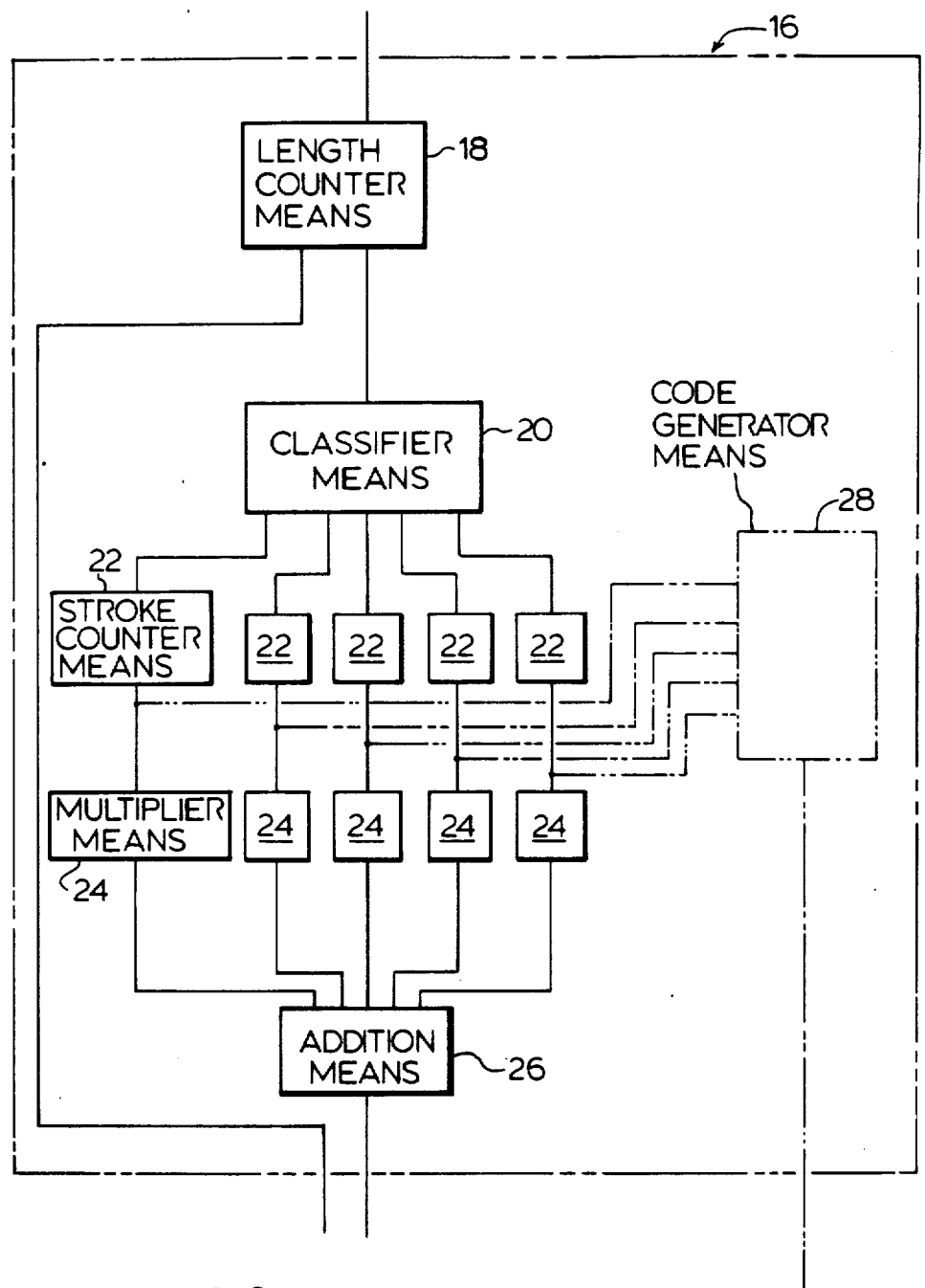
FIG. 3 is a block diagram of one embodiment of the complexity analysis means of FIG. 1.

Referring to FIG. 3, there is shown, in block diagram form, one embodiment of character complexity analysis means 16. Length counter means 18 is adapted to receive the character code from input device 12a. Length counter means 18 is operable to count the total number of code components in the character code string, yielding a character length number, and to deliver the code string to one output and a total number count to another output.

Classifier means 20 is connected to one output of length counter means 18 to receive the character code string. Classifier means 20 is operable to separate, or filter, the code components of the character code string according to element code. Classifier means 20 defines as many outputs as there are different element codes. In the illustrated embodiment, five outputs are shown, although other numbers could be used. The precise number will depend on the number of basic stroke elements in the method used to encode the ideographic characters. Classifier means 20 is operable to direct all code components of a particular element code to the same output.

Stroke counter means 22 are connected to each output of classifier means 22. Each counter means 22 is operable to count the number of code components received of a particular element code and to deliver a stroke count to an output.

A multiplier means 24 is connected to the output of each stroke counter means 22. Each multiplier means 24 is operable to multiply the stroke count by a pre-determined reliability weighting factor and to deliver a weighted stroke count to an output. Different multiplier means 24 may be set to multiply by different factors. A multiplier means 24 may be adjustable, in the event that is is desired to vary the weighting factor.

An addition means 26 is connected to all the outputs of multiplier means 24. Addition means 26 is operable to add together all the weighted stroke counts, to yield a character complexity number and to deliver same to an output.

Referring again to FIG. 1, comparison boundary setting means 30 is connected to the outputs of character complexity analysis means 16.

Boundary setting means 30 is operable to determine two particular address locations as function of the character length number and complexity number and to deliver such addresses to two outputs. One such address corresponds to a starting location, the other to a finishing location.

Boundary setting means 30 contains a internal index list means 31 of address locations arranged by length number and complexity number. A layout of a portion of a sample index list means 31 is illustrated in FIG. 4. Given any particular length and complexity numbers, boundary setting means 30 is operable to select the starting address from the index 31. For example, referring to FIG. 4, for length number 10 and complexity number 25, the starting address is 600. Boundary setting means 30 is also operable to identify the finishing address, in the example, 649. Index 31 need not actually tabulate the finishing address because it can be calculated from the starting address of the subsequent length/complexity entry in the table. Accordingly, the finishing address portion of the table in FIG. 4 is shown in phantom. In the example, the starting address for the next entry (length number 10 and complexity number 26) is 650, minus 1, yields the finishing address 649 for length number 10 and complexity number 25.

Character comparator means 32 is connected to the outputs of boundary setting means 30. Comparator means 32 is also connected and adapted to receive the character code string from input means 12a.

Comparator means 32 is also connected to an information storage means 34. Storage means 34 contains a collection or set (for example, a library, listing or data base) of all standard ideographic characters (say 10,000 chinese ideographs), which system 14 is expected to manipulate. Each ideograph is stored in its correctly encoded form to define a standard character code for such ideograph. Other information, such as for the output of the actual ideographic character, may also be contained in storage means 34 in association with the standard character code.

The standard character codes in the set are arranged generally according to complexity. Specifically, such arrangement is according to character length and complexity numbers. Preferably, the codes are first arranged into standard sub-sets according to length number, then within each standard sub-set according to length complexity number. Such an arrangement provides an ordering of ideographic characters corresponding roughly to increasing visual complexity.

Comparator means 32 is operable to individually compare the incoming character code with preferably only a portion of the standard codes. In particular, comparator means 32 is operable to make comparisons between the incoming character code and all standard character codes stored from the starting address to the finishing address, inclusively, of storage means 34 as determined by boundary sitting means 30. Furthermore, comparator means 32 is operable to rank those standard codes which are compared according to the closeness of a match to the incoming character code. After the comparison operation, comparator means 32 preferably is operable to deliver at least the highest ranked standard codes and their ranking scores to outputs. In the event of an exact match, comparator means 32 is operable to deliver a pre-determined highest possible ranking, i.e. a match, score.

Comparator means 32 may be a conventional apparatus known in the art. One such apparatus is an electronic integrated circuit sold under the trademark PROXIMITY PF474 by Proximity Devices Corporation. However, other comparator means may be used.

Exact match testing means 35 is connected to comparator means 32 and is adapted to receive at least the highest ranked standard code and its ranking score therefrom. Testing means 35 is operable to compare the ranking score to the match score. If it matches, testing means 35 is operable to pass the standard code through one output to the output of validation device 10 and into system 14. If there is no match, match testing means 35 is operable to pass all the high ranked standard codes to another output.

Character generator means 36 is connected to the second output of exact match testing means 35 and is adapted to receive the high ranked standard codes therefrom. Character generator means 36 is operable to generate output data for the display of each of the actual high ranked standard ideographic characters and, if desired, of their standard character codes. Such output data may be obtained from an internal storage means (not shown) arranging display data according to character code, or, with suitable indexing or addressing, from storage means 34 (connections not shown).

A display means 38, such as a video display terminal, printer or other output device, is connected to character generator means 36 and is adapted to receive output data therefrom. Display means 38 is operable to display each of the high ranked ideographic characters. Display means 38 may also be operable, if desired, to display the correct character code for each of the high ranked ideographic characters.

Character generator means 36 or display means 38 may include an alarm means (not shown) operable to be activated upon the delivery of various character codes to display means 38. Such activation would be an indication that the incoming character code is incorrect (i.e., there was no exact match with a standard character code) and that possible correct ideographs are being displayed. Such an alarm means could be located anywhere in validation device 10 where it could be activated upon exact match testing means 35 failing to find an exact match.

Selector means 40 is connected to character generator means 36 and is adapted to receive the high ranked character codes therefrom. Selector means 40 is connected to and operable to receive input from input means 12b, representing the operator's choice of the correct ideographic character from those displayed. In case the operator does not wish to select any of the displayed characters, input means 12b is also operable to enter a "cancel" signal, indicating his choice to attempt to encode the same ideographic character another time.

Selector means 40 is operable to pass the standard character code of a selected correct ideographic character to system 14 or, upon receipt of a "cancel" signal from input means 12b, to reset itself for another encoding attempt without passing any code to system 14.

Input means 12a and 12b may, in fact, comprise only one input device, operable at different times in different modes.

An initialize means 41 (shown in phantom in FIG. 1) may be inserted at the input to validation device 10. Initialize means 41 may be operable (connections not shown) to initialize each, or at least some, components of validation device 10 upon completion of the validation of a previous incoming character code and upon passing of a character code from input means 12a to complexity analysis means 16. Initialize means 41 may include temporary storage buffers to store incoming data. Other apparatus or methods for initializing validation device 10 may be used.

In operation, an operator will operate input means 12a to enter a character code string, which he believes to be a correct encoding of a particular ideographic character 1 (see example in FIG. 5), using the set of pre-determined basic stroke elements and sequencing rules. Each component of validation device 10 initializes upon receipt of an incoming character code. If initialize means 41 is used, it operates to initialize all, or at least some, components of validation device 10. Initialization enables each component to operate as required.

Complexity analysis means 16 receives the incoming character code and counts the total number of code components, namely, in the illustrated example, 5. The character length number is therefore 5.

Complexity analysis means 16 counts the number (i.e., the stroke count) of code components of each different element code in the character code string. In the example of FIG. 5, the stroke counts are:

1 dot basic stroke element;
2 horizontal basic stroke elements;
1 vertical basic stroke element;
1 left oblique basic stroke element; and,
0 right oblique basic stroke elements.

Complexity analysis means 16 assigns reliability weighting factors to each element code. In the example of FIG. 5:

a. A dot basic stroke element is assumed to be the least reliable stroke and the most likely to be confused with another stroke. It is assigned a reliability weighting factor of 1;

b. Horizontal and vertical basic stroke elements are assumed to be the most reliable strokes and the least likely to be confused with other strokes. Each is assigned a reliability weighting factor of 3; and, c. Left and right oblique basic stroke elements are assumed to be more reliable and less confusing than dot elements, but are assumed to be less reliable and more confusing than horizontal or vertical elements. Each is assigned a reliability weighting factor of 2.

Complexity analysis means 16 multiplies each stroke count by its corresponding reliability weighting factor to obtain a weighted stroke count. Subsequently, complexity analysis means 16 adds all the weighted stroke counts together, yielding a character complexity number. In the example of FIG. 5:

| basic stroke element | stroke count | | weighting factor | | weighted count |
|---|---|---|---|---|---|
| dot | 1 | × | 1 | = | 1 |
| horizontal | 2 | × | 3 | = | 6 |
| vertical | 1 | × | 3 | = | 3 |
| left oblique | 1 | × | 2 | = | 2 |

-continued

| basic stroke element | stroke count | weighting factor | | weighted count |
|---|---|---|---|---|
| right oblique | 0 | × 2 | = | 0 |
| | total = character complexity number = | | | 12. |

Boundary setting means 30 receives the character length and character complexity numbers. Boundary setting means 30 operates to determine the boundaries (namely, the starting and finishing address locations) of the portion of the set of ideographic characters, which will be compared to the incoming character code.

Comparator means 32 receives the starting and finishing addresses and the incoming character code. It compares the incoming character code to that of each member of the ideographic set in storage means 34 from the starting to the finishing address, inclusively, as determined by boundary setting means 30. Comparator means 32 also ranks the compared standard character codes according to the closeness of a match with the incoming character code.

Comparator means 32 passes the high ranked standard codes and their ranking scores to exact match testing means 35. If the highest ranked score corresponds to the match score, the highest ranked standard code is passed directly to system 14. If the highest ranked score does not correspond to the match score, all the high ranked standard character codes are passed to character generator means 36. Character generator means 36 delivers display data to display means 38, which in turn displays the high ranked characters. The optional alarm means, if used, alerts the operator that the incoming character code is incorrect (i.e. there was no exact match with one of the standard character codes) and that possible correct ideographs are being displayed.

Selector means 40 receives all high ranked character codes. The operator reviews the displayed ideographs and may decide that one of them is the correct ideograph which he desires to input into system 14. Alternatively, he may wish to cancel his first coding attempt and make another attempt to correctly encode the desired ideographic character. In either event, he enters his selection at input means 12b. According to such selection, selector means 40 either passes the standard character code of the selected ideographic character to system 14 or resets. In the latter case, the operator may then enter another character code string at input means 12a as his second attempt to encode the ideographic character. The operation of validation device 10 would be repeated on such new character code, as described above.

Referring to FIG. 3, the illustrated embodiment operates as follows. Length counter means 18 receives the incoming character code from input device 12a. Length counter means 18 counts the total number of code components in the incoming character code string, yielding a character length number. It passes the incoming character code to one output and the character length number to another.

Classifier means 20 receives the incoming character code string. It separates, or filters, the code components of the incoming character code according to element code. Classifier means 20 directs all code components of a particular element code to the same output.

Each multiplier means 24 receives and multiplies its associated stroke count by its pre-determined reliability weighting factor and delivers a weighted stroke count to an output. The reliability weighting factors of all multiplier means 24 are preferably set prior to initial operation of validation device 10.

Addition means 26 receives the weighted stroke counts from each of the multiplier means 24. It adds such weighted stroke counts together, yielding a character complexity number, which it delivers to an output.

The various components of validation device 10 described above are well understood and may be constructed and operated by those skilled in the art. In some instances, certain components may be obtained "off-the-shelf" as standard items.

Embodiments for achieving the same results, other than those illustrated, may be apparent to those skilled in the art. For example only, a stroke counter means 22 and a corresponding multiplier means 24 of FIG. 3 may be combined into one new counter means, which counts not by ones but by multiples equal to the reliability weighting factor. Other variations may be apparent to those skilled in the art.

In some instances, it may be desirable to create and use an identification code having a constant number of code components, such number depending on the number of different element codes. Such a code may not, and need not, be unique for each character. Referring to FIG. 3, such an identification code may be conveniently generated in complexity analysis means 16 by optional code generator means 28 included therein. Code generator means 16 is connected to the output of all stroke counters 22 and is shown in dashed lines. Code generator means 28 is operable to combine the stroke counts into a single fixed length identification code. For example, each element code may be assigned a place or places in a fixed length code number. The stroke count for a particular element code may be inserted into its corresponding assigned place. In such fashion, all the stroke counts may be combined into a single identification code. Such identification code may be considered as, in effect, classifying the ideographic character according to the number of each type of component stroke. Code generator means 28 is operable to deliver the identification code to a third output of complexity analysis means 16. An alternate identification code could be generated by connecting code generator means 28 to the output of all multipliers 24.

Figure 6:
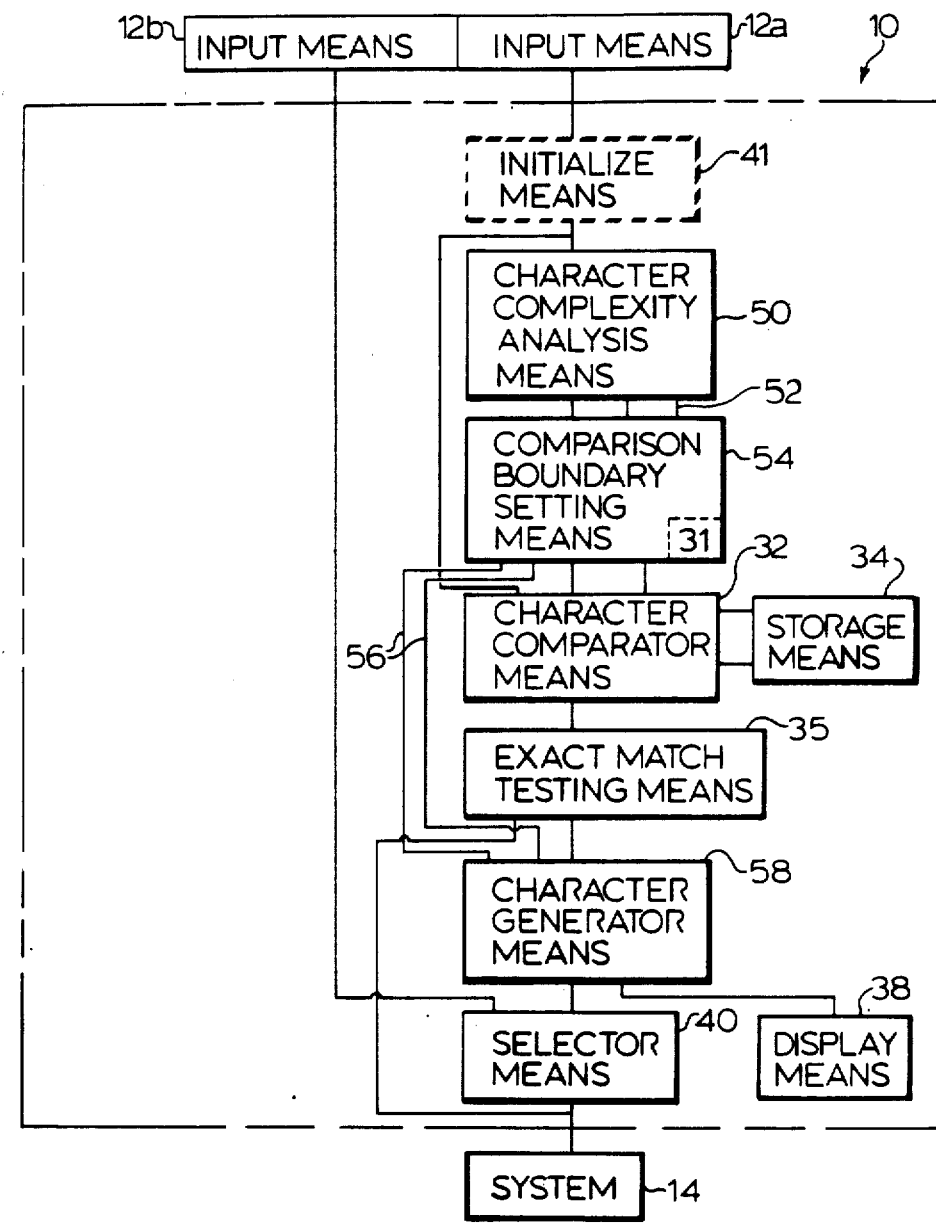
FIG. 6 is a block diagram of an apparatus according to a further embodiment of the invention.

Referring to FIG. 6, in addition to the functions of complexity analysis means 16 (FIG. 1), character complexity means 50 is also operable to deliver an identification code to a third output 52. Comparison boundary setting means 54 is adapted to receive the identification code from output 52 and to determine the starting and finishing addresses as a function of character length number, complexity number and identification code. If the difference between the starting and finishing addresses corresponds to less than a pre-determined minimum number of characters, comparison boundary setting means 54 is operable to by-pass character comparator means 32 by delivering the starting and finishing addresses directly to character generator means 58 through connection 56.

Figure 10:
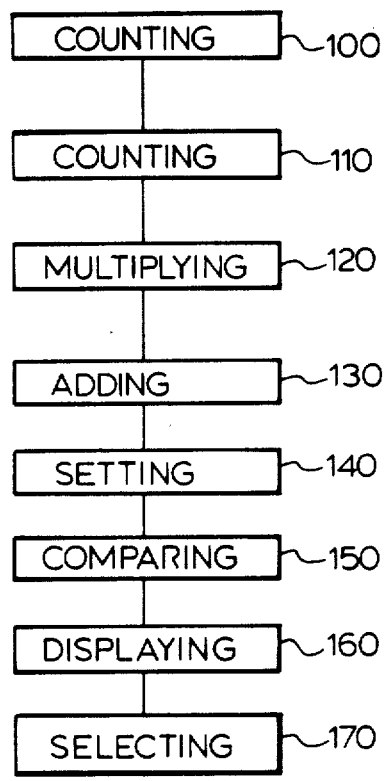
FIG. 10 is a schematic diagram of a method according to the invention.

The set of standard ideographs stored in storage means 34 in the embodiment of FIG. 10 is preferably arranged according to length and complexity numbers, then identification code. However, other arrangements depending on such numbers and code may be used.

In addition to the functions of character generator means 36 (FIG. 1), character generator means 58 is also operable to receive the starting and finishing addresses at connection 56 and to generate output data for the display of all the characters between such addresses, namely all the characters having the same length number, complexity number and identification code. Character generator means 58 may be connected to storage means 34, or it may have its own internal storage, for the purpose of such generation.

On the other hand, if there are a large number (more than the pre-determined minimum) of characters having the same identification code, boundary setting means 54 is operable to deliver its output to character comparator means 32, which operates in the previously described manner.

In operation, referring to the example in FIG. 5, the identification code is generated as follows:

|  | dot | horizontal | vertical | left | right |  |
|---|---|---|---|---|---|---|
| identification code | 1 | 2 | 1 | 1 | 0 | = 12110. |

If there are only a few characters having the same length and complexity numbers and identification code, the validation process may be expedited by by-passing comparator means 32 and displaying all such characters directly.

Figure 7:
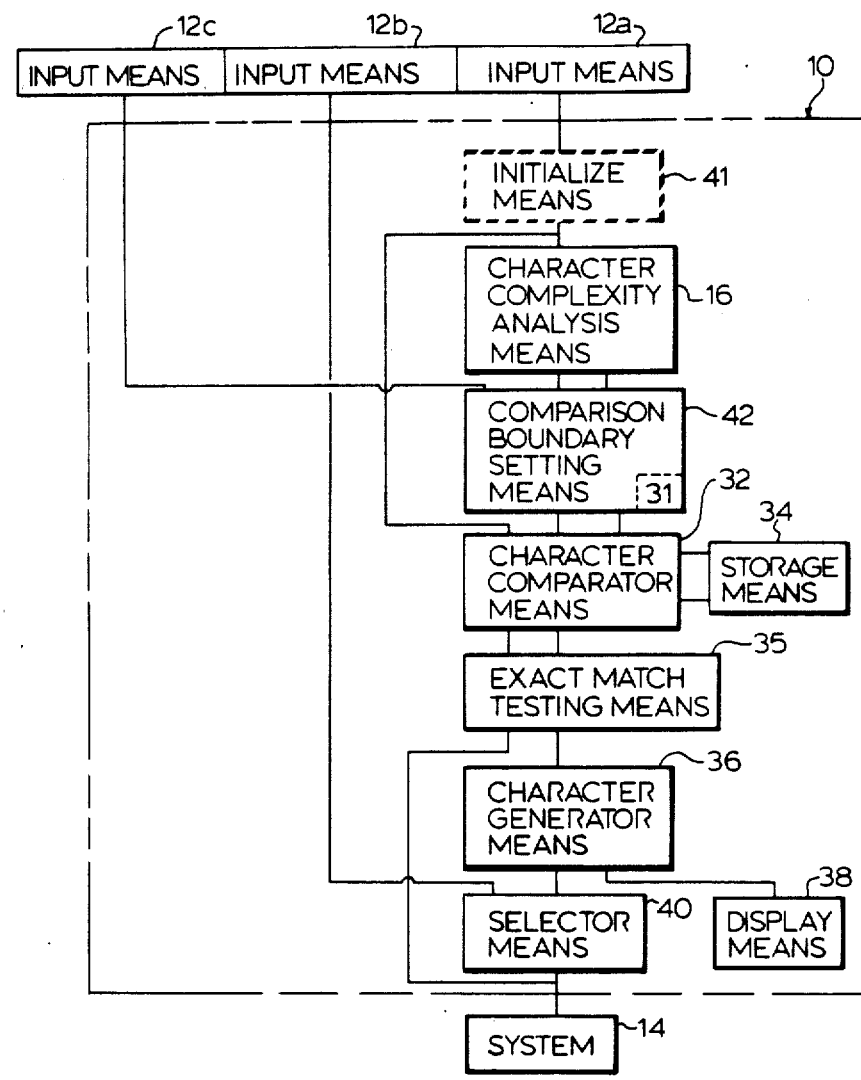
FIG. 7 is a block diagram of an apparatus according to a further embodiment of the invention.

In a further embodiment, validation device 10 may be tuned to the experience and expertise of the operator. Referring to FIG. 7, input means 12c is connected to comparison boundary setting means 42. Input means 12c is operable to allow the operator to enter an expertise number, corresponding to the level of his expertise in encoding ideographic characters. Input means 12a, 12b and 12c may all in fact comprise one input device, operable at different times in different modes.

Boundary setting means 42 is operable to receive the expertise number, in addition to the character length and the character complexity numbers. Boundary setting means 42 operates similarly to boundary setting means 30 (FIG. 1). However, boundary setting means 42 is operable to select the starting address from the index as a function of character length number, complexity number and expertise number. For example, the starting address may be determined by length number and the difference between the complexity and expertise numbers. It is also operable to identify the finishing address from the index as a function of character length number, complexity number and expertise number. For example, the finishing address may be determined by length number and the sum of the complexity and expertise numbers.

For example, referring to FIG. 4, a highly experienced operator may have an expertise number of 0. For a character length number 10 and complexity number 25, the starting address is 600 and the finishing address is 649. A less experienced operator may have an expertise number of 1. Accordingly, his startng address corresponds to length number 10 and complexity 24 (i.e. the difference: complexity 25 minus expertise 1), that is address 500. Similarly, his finishing address corresponds to length number 10 and sum 26 (i.e. complexity 25 plus expertise 1),that is address 699.

In operation, an operator enters a number, corresponding to his level of expertise. During the analysis of a character code, the basic operation of validation device 10 is as described above. However, the portion of the ideograph set in storage means 34, which is compared by comparator means 32 to the incoming character code, is of increased size, due to the widening of the boundaries by boundary setting means 42. Accordingly, the comparing and ranking operation by comparator means 32 is somewhat more time consuming. However, the operation remains less time consuming than it would if the entire ideograph set were compared to the incoming character code.

Figure 8:
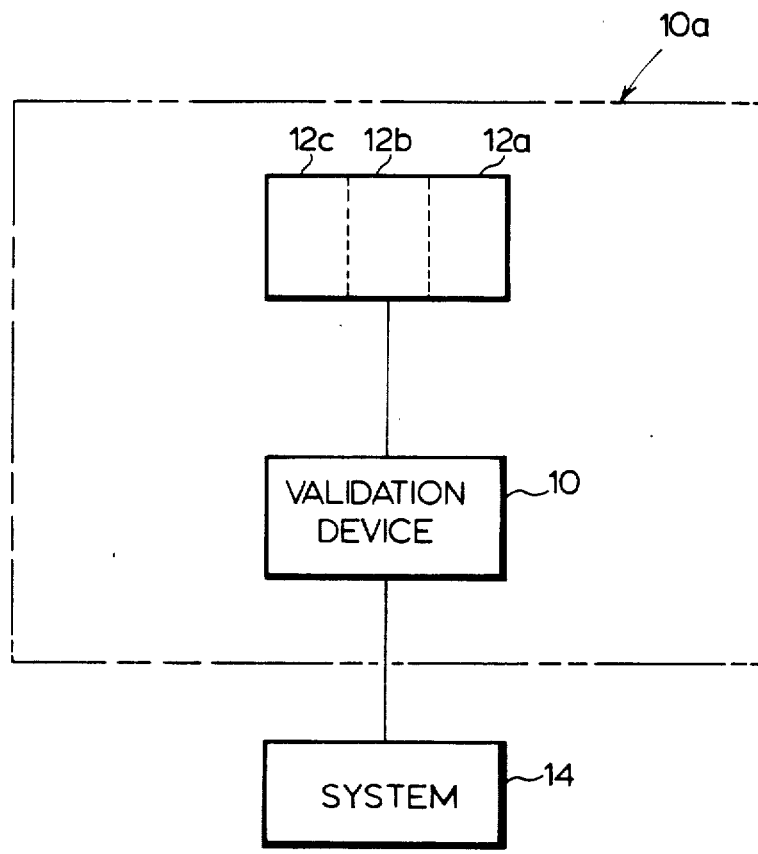
FIG. 8 is a block diagram of an apparatus according to a further embodiment of the invention.

Referring to FIG. 8, in a further embodiment, validation device 10a may comprise one or more of input means 12a, 12b and 12c (if used) integrally combined together with validation device 10.

In a further embodiment (not shown), a simple validation device according to the invention may be used. The complexity analysis means may rely only on a character length number as an indication of character complexity. The comparison boundary setting means would merely rely on the character length number for determining the starting and finishing address locations. The internal index of the boundary setting means would be organized accordingly. In such an embodiment, referring to FIG. 3, classifier means 20, stroke counter means 22, multiplier means 24 and addition means 26 could all be eliminated. The character length number would thus be directed to the output of complexity analysis means 16, thus essentially taking the place of the complexity number.

Figure 9:
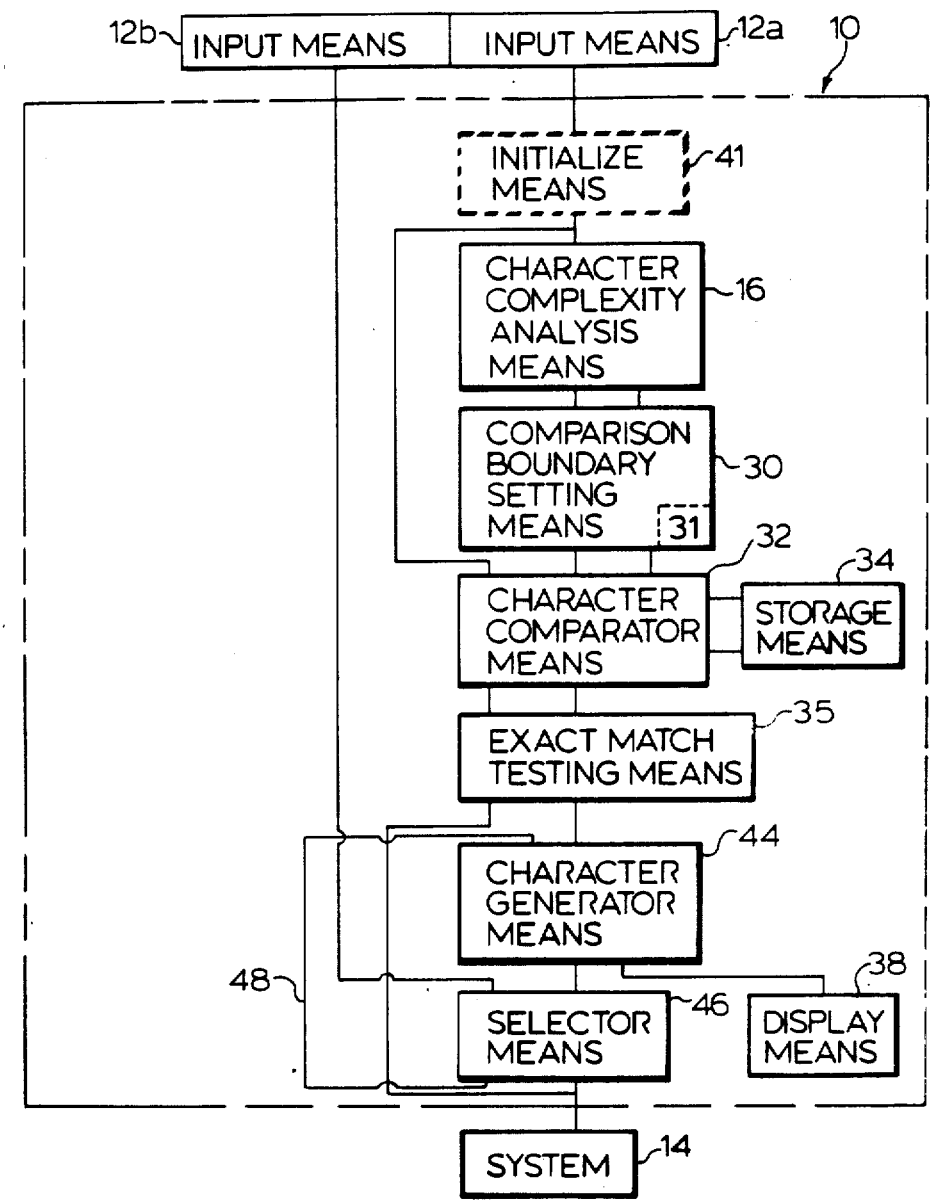
FIG. 9 is a block diagram of an apparatus according to a further embodiment of the invention.

In yet a further embodiment, a validation device according to the invention may be made, which will instruct the operator as to correct character codes. Referring to FIG. 9, an output of selector means 46 is connected to character generator means 44 via connection 48. Selector means 46 is generally operable in the same manner as selector means 40 (FIG. 1). However, in addition to passing the correct character code to system 14, it is also operable to deliver such code to character generator means 44. Upon delivery of such code to character generator means 44, selector means 46 may be operable to delay passing the correct code to system 14 either for a fixed interval or until a "continue" signal is received from input means 12b.

Similarly, character generator means 44 is generally operable in the same manner as character generator means 36 (FIG. 1). However, in addition, it is also operable to receive the correct character code from selector means 46, to generate display data therefor and for the ideographic character itself and to deliver same to display means 38.

In operation, the operator will have an opportunity to review and learn the correct character code for the ideographic character which he was attempting to enter. Over time, such review will allow the operator to improve his expertise. He will not only be learning specific ideographs and their codes, but he will also be learning the general encoding techniques for the encoding method in use. For example, he will learn what component strokes are classed as dot, horizontal, vertical or oblique basic stroke elements. In addition, he will become familiar with stroke ordering sequences or rules.

When the operator is satisfied with his review of the correct character code for the particular ideographic character, he may enter a "continue" signal at input means 12a.

The method according to the invention comprises the various operational steps described above in relation to the functions of validation device 10 and of its alternate embodiments.

In general, the method comprises the steps of specifying a portion of a set of standard encoded characters (ordered according to the complexity of the standard characters) according to the complexity of the incoming character, searching such portion for at least the closest match between the incoming character and a standard character, and, selecting one of the closely matched standard characters as the correct encoding for the incoming character.

In particular, referring to FIG. 10, one method according to the invention comprises the steps of:

counting 100 the total number of code components in the incoming character code, yielding a character length number;

counting 110 the number of each different element code in the character code, yielding a stroke count;

multiplying 120 each stroke count by a pre-determined reliability weighting factor, yielding a weighted stroke count in each instance;

adding 130 the weighted stroke counts together, yielding a character complexity number;

specifying or setting 140 boundaries according to the length number and complexity number;

searching or comparing 150 the incoming character code to standard character codes stored in a storage means between the established boundaries and ranking such standard character codes according to the closeness of match to the incoming character code, the standard codes being arranged according to character complexity;

displaying 160 the ideographs having high ranked character codes; and, selecting 170 a correct ideograph and passing its correct character code to the system.

In a further embodiment, a simpler method may be used. Steps 110 and 140 above could be replaced with the following: setting boundaries according to the length number.

In a further embodiment, a first step may be:

setting an operator expertise index, and step 140 may be replaced with the following:

setting boundaries according to the length number, complexity number and expertise index.

In particular, the setting of boundaries may be accomplished according to the length number and complexity number plus and minus the expertise index.

In a further embodiment, a final step may be added as follows:

displaying the correct ideograph together with its correct character code.

In a further embodiment, the boundaries of the portion of the set of standard characters may be specified according to identification code. The method may further include the steps of:

determining the number of standard characters in such portion of the set, in the event that the number of such characters is less than a pre-determined minimum number, displaying the characters, and, selecting either a correct character from amongst those displayed, performing the searching step or entering a new incoming character.

In many instances, it will be desirable to apply the method to a series of incoming character codes. Accordingly, in a further embodiment, the following steps may be added:

initializing all apparatus used to perform the above steps, whereby to accept a next incoming character code; and, repeating the above steps until all incoming character codes have been validated and correct codes passed to the system.

The foregoing is a description of preferred embodiments of the invention, which is given here by way of example only. The invention is not to be taken as limited to any of the specific features described, but comprehends all such variations thereof as come within the scope of the appended claims.

What is claimed is:

1. A method for validating the encoding of an incoming character having a particular complexity and encoded according to a group of pre-determined basic stroke elements and stroke sequencing rules to define an incoming character code, the method comprising the steps of:

ordering a set of standard characters encoded according to said group of pre-determined basic stroke elements and stroke sequencing rules to define standard character codes, each standard character having a certain complexity, said ordering being according to the complexities of the standard characters;

specifying a portion of said set according to the complexity of said incoming character;

searching said portion for at least a closest match between said incoming character code and a said standard character code, and determining a sub-set of said portion, said sub-set containing at least one standard character code having said closest match with said incoming character code; and, selecting one member of said sub-set of closely matched standard character codes as the correct code for said incoming character.

2. A method for validating the encoding of an incoming character having a particular complexity and encoded according to a group of pre-determined basic stroke elements and stroke sequencing rules to define an incoming character code, for use in association with a set of standard characters encoded according to said group of pre-determined basic stroke elements and stroke sequencing rules to define standard character codes, each standard character having a certain complexity, said set being oredered according to the complexities of the standard characters, the method comprising the steps of:

specifying a portion of said set according to the complexity of said incoming character;

searching said portion for at least a closest match between said incoming character code and a said standard character code, and determining a sub-set of said portion, said sub-set containing at least one standard character code having said closed match with said incoming character code; and, selecting one member of said sub-set of closely matched standard character codes as the correct code for said incoming character.

3. A method according to claim 2 wherein each said character code is a string of code components, the number of said code components defining a length number, and said length number representing the complexity of said character and wherein said set is ordered according to the length number of each standard character and said portion of said set is specified according to the length number of the incoming character.

4. A method as claimed in claim 2 wherein each basic stroke element is assigned a unique element code and has a pre-determined reliablity for encoding purposes, each said character code is a string of code components each of which is an element code, each said character defines a complexity number according to the reliablity and number of each type of element code in said character code for said character, said complexity number representing the complexity of said character, said set is ordered according to the complexity numbers of said standard characters, and said portion of said set is specified according to the complexity number of the incoming character.

5. A method as claimed in claim 4 wherein:
the number of code components in a character code defines a length number;
said set defines standard sub-sets according to the complexity numbers of the standard characters, the members of a standard sub-set each having the same complexity number, each standard sub-set representing a different complexity number and each standard sub-set being ordered according to the length numbers of the standard characters in the standard sub-set; and,
said portion of said set is specified according to the length and complexity numbers of the incoming character.

6. A method as claimed in claim 4 wherein:
the number of said components in a character code defines a length number;
said set defines standard sub-sets according to the length numbers of the standard characters, the members of a standard sub-set each having the same length number, each standard sub-set representing a different length number and each standard sub-set being ordered according to said complexity numbers of the standard characters in the standard sub-set; and,
said portion of said set is specified according to the length and complexity numbers of the incoming character.

7. A method as claimed in claim 6 wherein said complexity number is obtained by counting the number of each type of element code in the character code yielding a stroke count number for each said type, adjusting each said stroke count number according to the reliability of the corresponding basic stroke element to yield a weighted stroke count for each element code, and summing the weighted stroke counts, to yield a complexity number.

8. A method as claimed in claim 7 wherein said length number is obtained by counting the number of code components in the incoming character code.

9. A method as claimed in claim 8 wherein said searching step comprises comparing the incoming character code to each standard character code in said portion of said set and ranking such standard character codes according to the closeness of match with the incoming character code.

10. A method as claimed in claim 9 wherein said selecting step comprises displaying the standard characters having the highest ranked standard character codes, and selecting either a correct character from amongst those displayed or an opportunity to enter a new incoming character.

11. A method as claimed in claim 10 including a final step of displaying the correct character together with its character code.

12. A method as claimed in claim 9 wherein, after said searching step, the method includes the step of testing a highest ranked character code for an exact match with said incoming character code, and in the event of an exact match, by-passing said selecting step.

13. A method as claimed in claim 12 including, in the event there is no exact match, the step of operating an alarm.

14. A method as claimed in claim 12 wherein the correct character code for the incoming character is made available for use in an electronic data handling system.

15. A method as claimed in claim 12 for use in association with a series of incoming character codes wherein each step in said method is carried out by physical apparatus and the method further comprises the steps of initializing all said apparatus, whereby to accept a next incoming character code, and repeating all previous steps until the entire said series has been validated.

16. A method as claimed in claim 7 wherein each character defines an identification code according to the number in its corresponding character code of each type of element code, said set is also ordered according to identification code, said specifying step is also according to the identification code of the incoming character, and thereafter the method further comprises the steps of:
determining the number of standard characters in said portion of said set,
in the event that said number of characters is less than a pre-determined minimum number, displaying said characters in said portion of said set;
choosing either a correct character from amongst those displayed or entering a new incoming character; and,
in the event that said number of characters is greater than or equal to said pre-determined minium number, performing said searching and selecting steps.

17. A method as claimed in claim 6 wherein the portion of said set is also specified according to an expertise index indicative of the level of expertise of the operator, whereby said portion is relatively large for inexpert operators and relatively small for expert operators.

18. A method as claimed in claim 17 wherein said portion defines lower and upper bounds and one said bounds is determined by adding the expertise index to the complexity number of the incoming character and the other said bounds is determined by subtracting the expertise index from the complexity number of the incoming character.

19. An apparatus for validating the encoding of an incoming character having a particular complexity and encoded according to a group of pre-determined basic stroke elements and stroke sequencing rules to define an incoming character code, said apparatus comprising:
character complexity analysis means for receiving the incoming character code and determining the complexity of the incoming character according to the incoming character code;
comparison boundary setting means connected to said complexity analysis means;
character comparator means connected to said boundary setting means;
storage means connected to said comparator means for storing a set of standard characters, encoded according to said group of pre-determined basic stroke elements and stroke sequencing rules to define standard character codes, each standard character having a certain complexity, and said set being ordered according to the complexities of the standard characters;

said boundary setting means being operable to specify a portion of said set according to the complexity of said incoming character;

said comparator means being operable to search said portion for at least a closest match between said incoming character code and a said standard character code, and determining a sub-set of said portion, said sub-set containing at least one standard character code having said closest match with said incoming character code; and, selector means connected to said comparator means for selecting one member of said sub-set of closely matched standard character codes as the correct code for said incoming character.

20. An apparatus for validating the encoding of an incoming character having a particular complexity and encoded according to a group of pre-determined basic stroke elements and stroke sequencing rules to define an incoming character code, for use in association with a set of standard characters, encoded according to said group of pre-determined basic stroke elements and stroke sequencing rules to define standard character codes, each standard character having a certain complexity, said set being ordered according to the complexities of the standard characters, the apparatus comprising:

character complexity analysis means for receiving the incoming character code and determining the complexity of the incoming character according to the incoming character code;

comparison boundary setting means connected to said complexity analysis means;

character comparator means connected to said boundary setting means;

storage means connected to said comparator means for storing said set;

said boundary setting means being operable to specify a portion of said set according to the complexity of said incoming character;

said comparator means being operable to search said portion for at least a closest match between said incoming character code and a said standard character code, and determining a sub-set of said portion, said sub-set containing at least one standard character code having said closest match with said incoming character code; and, selector means connected to said comparator means for selecting one member of said sub-set of closely matched standard character codes as the correct code for said incoming character.

21. An apparatus as claimed in claim 20 wherein each said character code is a string of code components, the number of said code components defining a length number, and said length number representing the complexity of said character and wherein said set is ordered according to the length number of each standard character and said boundary setting means is operable to specify said portion of said set according to the length number of the incoming character.

22. An apparatus as claimed in claim 20 wherein each basic stroke element is assigned a unique element code and hs a pre-determined reliability for encoding purposes, each said character code is a string of code components each of which is an element code, each said character defines a complexity number according to the reliability and number of each type of element code in said character code for said character, said complexity number representing the complexity of said character, said set is ordered according to the complexity numbers of said standard characters, and said boundary setting means is operable to specify said portion of said set according to the complexity number of the incoming character.

23. An apparatus as claimed in claim 22 wherein:

the number of said code components in a character code defines a length number;

said set defines standard sub-sets according to the complexity numbers of the standard characters, the members of a standard sub-set each having the same complexity number, each standard sub-set representing a different complexity number and each standard sub-set being ordered according to the length of the standard characters; and, said boundary setting means is operable to specify said portion of said set according to the length and complexity numbers of the incoming character.

24. An apparatus as claimed in claim 22 wherein:

the number ofcode components in a character code defines a length number;

said set defines standard sub-sets ccording to the length numbers of the standard characters, the members of a standard sub-set each having the same length number, each standard sub-set representing a different length number and each standard sub-set being ordered according to said complexity numbers; and, said boundary setting means is operable to specify said portion of said set according to the length and complexity numbers of the incoming character.

25. An apparatus as claimed in claim 24 wherein said character complexity anaylsis means is operable for a character code to count the total number of code components yielding the length number, to count the number of each type of element code yielding a stroke count number for each said type, to adjust the stroke count numbers according to the reliability of respective corresponding basic stroke elements yielding a weighted stroke count for each element code, and to sum the weighted stroke counts yielding a complexity number.

26. An apparatus as claimed in claim 25 wherein said character complexity analysis means comprises:

length counter means for counting the total number of code components, yielding said length number;

second counter means connected to the length counter means to receive the incoming character code, for counting the number of each type of element code, yielding a said stroke count number for each said type;

multiplier means connected to each said second counter means for receiving a said stroke count number and multiplying it by a pre-determined reliability weighting factor according to the reliability of the corresponding basic stroke element, yielding a said weighted stroke count; and, summing means connected to said multiplier means for receiving all said weighted stroke counts and summing same together, yielding said complexity number.

27. An apparatus as claimed in claim 26 wherein said second counter means comprises:

classifier means connected to the length counter means to receive the incoming character code, for classifying the code components according to element code and, stroke counter means connected to the classifier means for receiving and counting all code components corresponding to each said element code.

28. An apparatus as claimed in claim 26 wherein said comparator means is operable to compare the incoming character code to each said standard character code in said portion of said set and to rank such standard character codes according to the closeness of match with the incoming character code.

29. An apparatus as claimed in claim 28 wherein said apparatus further comprises:

character generator means connected to said comparator means, for generating display data for the standard characters having the highest ranked standard character codes; and, display means connected to the character generator means, for displaying characters according to said data.

30. An apparatus as claimed in claim 29 wherein said selector means is operable to select either a said displayed standard character as the correct character or an opportunity to enter a new incoming character code.

31. An apparatus as claimed in claim 30 wherein an input means is connected to said selector means, for inputting an operator's said selection.

32. An apparatus as claimed in claim 31 including input means connected to the complexity analysis means for entering incoming character codes.

33. An apparatus as claimed in claim 30, for use in association with an input means, wherein said selector means is adaptable to be connected with said input means for inputting an operator's said selection.

34. An apparatus as claimed in claim 30 wherein said comparator means is operable to determine a ranking score for each standard character of said portion, corresponding to the closeness of match with the incoming character code, and said apparatus further comprises an exact match testing means connected between said comparator means and said character generator means, for receiving a highest said ranking score and determining whether said score corresponds to an exact match, and in the event of an exact match, directing the exactly matched standard character code to an output of said apparatus, by-passing said selector means.

35. An apparatus as claimed in claim 34 further comprising alarm means connected to said apparatus after said match testing means, for providing alarm indication in the event that there is no exact match.

36. An apparatus as claimed in claim 34 for use in association with an electronic data handling system wherein said selector means defines output means connectible with said system for delivering the correct code for said incoming character thereto.

37. An apparatus as claimed in claim 30 wherein said selector means is connected to said character generator means, said selector means being operable to deliver said correct code for said incoming character to said character generator means, and said character generator means being operable to generate display data for said correct character and the correct character code therefor and to deliver same to the display means for display.

38. An apparatus as claimed in claim 30 including initialization means for initializing said apparatus whereby to accept a next incoming character for validation.

39. An apparatus as claimed in claim 26 wherein an identification code generator means is connected to said character complexity means to receive each said stroke count number, said identification code generator means being operable to combine said stroke count numbers into a fixed length identification code.

40. An apparatus as claimed in claim 39 wherein said set is also ordered according to identification code, said comparison boundary setting means is connected to said identification code generator means to receive said identification code and is connected to said character generator means, said boundary setting means further being operable to specify said portion of said set according to the identification code of the incoming character, and said character generator means being further operable to determine the number of standard characters in said portion of said set, and in the event that said number of characters is less than a pre-determined minimum number, to generate display data for said standard characters in said portion.

41. An apparatus as claimed in claim 24 wherein said boundary setting means is operable to specify said portion of said set according to the length and complexity numbers and a pre-determined operator expertise index, whereby said portion is relatively large for inexpert operators and relatively small for expert operators.

42. An apparatus as claimed in claim 41 wherein an expertise input means is connected to said boundary setting means, for varying said expertise index according to the level of expertise of the operator.

43. An apparatus as claimed in claim 41 wherein said boundary setting means is operable to establish lower and upper bounds and to determine one said bounds by subtracting the expertise index from the complexity number of the incoming character and to determine the other said bounds by adding the expertise index to the complexity number of the incoming character.

* * * * *